Jan. 13, 1970 D. Y. LEE 3,489,922

POLARITY SENSITIVE BI-STABLE REGENERATIVE SWITCHING CIRCUIT

Filed July 14, 1966

INVENTOR.
DAN Y. LEE
BY J. Peter Molm
AGENT
ATTORNEYS

United States Patent Office 3,489,922

Patented Jan. 13, 1970

3,489,922

POLARITY SENSITIVE BI-STABLE REGENERATIVE SWITCHING CIRCUIT

Dan Y. Lee, 734 39th Ave., San Francisco, Calif. 94121

Filed July 14, 1966, Ser. No. 565,325
Int. Cl. H03k 5/20
U.S. Cl. 307—236 2 Claims

ABSTRACT OF THE DISCLOSURE

This invention relates to a bi-stable switching circuit and more particularly to a polarity sensitive bi-stable switching circuit which is adapted to produce a first output level in response to an input of one polarity and a second output level in response to an input of an opposite polarity.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

For achieving a switching circuit which discriminates between positive and negative signals the prior art has offered numerous solutions. One of such solutions involves a diode gating circuit coupled to a bi-stable flip-flop circuit, the diode gate serving to discriminate between positive and negative pulses with the resulting gated pulse asymmetrically triggering the bi-stable flip-flop. This type of switching circuit requires at least four active components. In addition, since one side of the bi-stable flip-flop is always in the "on" state there is a significant power loss which may be aptly termed "stand-by power loss." Advances have been made however in reducing the number of components but even such circuits still suffer from the so-called stand-by power loss.

An object of the present invention is to provide a polarity sensitive switching circuit.

Another object is to provide a polarity sensitive bi-stable switching circuit.

A further object of the present invention is to provide a polarity sensitive bi-stable switching circuit requiring a minimum number of active components.

An additional object is to provide a polarity sensitive bi-stable switching circuit which has no stand-by power loss.

A still further object is to provide a polarity sensitive bi-stable switching circuit which is relatively insensitive to noise at its input.

The present invention achieves the above noted objects by utilizing three active elements, to wit, two transistors and a diode. The transistors are arranged so that when one is caused to assume its low impedance or "on" condition the other assumes the same condition. Similarly, when one is in its high impedance or "off" condition the other is also "off." The source of power for both transistors is so arranged that when they are both in the "off" condition no current will flow from the source and consequently no power will be lost.

The basic structure of the invention involves the two transistors in tandem, with a diode-containing regenerative feedback path running from the output of the second transistor to the input of the first transistor. The first transistor is actuated by a signal pulse of a given polarity to turn on the second transistor. The regenerative feedback loop or path passes a regenerative signal from the second transistor output to the first transistor input to cause the first transistor to become saturated and insensitive to subsequent input signal pulses of the same polarity as the type which actuated the first transistor. This insensitivity of the circuit to later pulses of the same polarity as the actuating pulse continues until the receipt of a pulse of the opposite polarity which, upon arriving at the first transistor input, will shut off both transistors. In the "off" condition the circuit once more becomes responsive to a pulse of the polarity necessary to again turn on the transistors. Consequently, the bi-stable switching circuit is switched between its "off" and "on" state in response to alternation of signal pulse polarities.

The above objects and features of this invention will be better understood from the following detailed description in conjunction with the attached drawings wherein.

Figure 1:
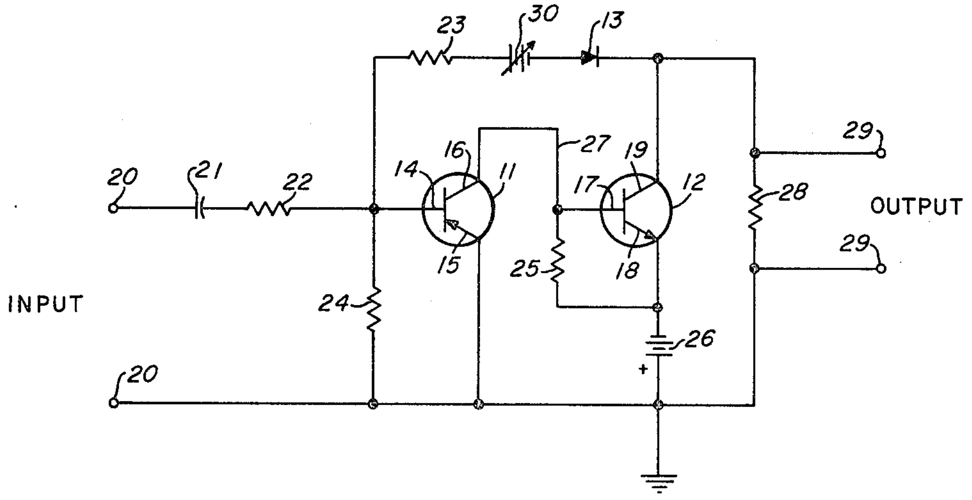
FIG. 1 is a schematic diagram of one embodiment of the present invention.

Referring now to the embodiment of the invention illustrated by the schematic diagram of FIG. 1, it can be noted that the circuit essentially comprises three active elements, to wit, transistor 11, transistor 12, and diode 13. It may be noted that the transistors 11 and 12 are of opposite conductivity types, transistor 11 being a PNP type whereas transistor 12 is an NPN. The first transistor, designated by numeral 11 has a base electrode 14, an emitter 15 and a collector 16. Similarly, transistor 12 has a base 17, an emitter 18 and a collector 19.

Input signals are supplied to the circuit of FIG. 1 at terminals 20. Signals received at terminals 20 are coupled to the base 14 of transistor 11 through a DC blocking capacitor 21 and input resistor 22. The bias on the base of transistor 11 is controlled by the voltage dividing network of resistors 23 and 24, resistor 24 being connected between base 14 and ground and resistor 23 having one side connected to base 14. Resistor 25 functions to provide bias to the base 17 of transistor 12. The only source of power for the circuit is battery 26 having its negative side connected to emitter 18 of transistor 12 and its positive side to ground. In such a polarity configuration, battery 26 may be described as being arranged to forward bias collectors 16 and 19 of transistors 11 and 12, respectively.

The collector 16 of transistor 11 is directly coupled to the base 17 of transistor 12 by lead 27. Consequently the voltage on the base of transistor 12 will always be the same as that on the collector of transistor 11. The output from the circuit is taken from the load resistor 28 which is connected between collector 19 and ground, terminals 29 representing the actual output points.

Essential to the operation of this invention is the feedback path provided between collector 19 and base 14. As shown, the feedback circuit includes the diode 13, a source 30 of adjustable voltage and resistor 23, all being serially connected. In the embodiment shown, it is essential that the diode be poled as illustrated, i.e., its cathode being connected to the collector 19 of transistor 12. The adjustable voltage source 30 is not essential to the operation of this invention and more properly illustrates a modification which might be desirable in certain applications of this circuit. When it is used, it is arranged to back bias diode 13 or in other words oppose conduction of the diode. It should be understood that source 30 may be entirely eliminated and diode 13 consequently connected directly to resistor 23. The purpose of the source 30 will be described in the ensuing description of the operation of this invention.

OPERATION

In the ordinary operation of the circuit of FIG. 1, transistors 11 and 12 essentially function as switching devices. In other words, either the transistors are conducting or "on" or non-conducting or "off." In the conducting state the transistors may be described as having a very small internal impedance between their emitter and collector whereas in the non-conducting state the internal impedance is very high. The conducting and non-conducting states of course infer that base current is flowing or not flowing, respectively.

It may be noted that the transistors are so arranged that if one is "on" or conducting the other will simultaneously be "on" and conducting. Similarly, if one is "off" both are "off."

For purposes of understanding the operation of the circuit, assume that initially both transistors are "off" and an input signal is not present. This implies that current is not flowing at any point in the circuit since the power source 26 is connected to an open circuit through transistor 12 and an open circuit through transistor 11. It should, therefore, be noted that in the "off" condition, or stand by, no power is used by the circuit. In such a condition, the voltage on base 17 of transistor 12 and emitter 18 will be at the same level, to wit, the negative level of source 26. Similarly, collector 16 of transistor 11 will also be fixed at the negative level of source 26. Emitter 15, being connected to ground, will consequently be at ground potential. With no input signal, base 14 of the transistor 11 also will be at ground potential since current is not flowing through resistor 24. Since the emitters and bases of both transistors are at the same potentials, respectively, base current does not flow in either of the transistors and they are in their "off" or high impedance state as previously assumed. For transistor 11 to be turned "on" its base must be at a negative potential relative to its emitter, since it is a PNP type device. Consequently, if a negative pulse is received at the input and subsequently coupled to the base 14 of transistor 11, base current will begin to flow in transistor 11 since its emitter is more positive than its base. Simultaneous to the beginning of conduction in transistor 11 current will flow through resistor 25 with the result that emitter 18 of transistor 12 will be more negative than the base 17. For transistor 12 to turn "on," its base must be positive relative to its emitter, since it's an NPN device. Transistor 12 will thus begin conducting current through load resistor 28 and the voltage on its collector will drop towards the negative voltage on its emitter, since the internal impedance of transistor 12 will approach a very small value. With a substantial negative voltage on collector 19 of the transistor 12 and a lesser negative signal on the base of transistor 11 the regenerative feedback path will come into play since diode 13 will be biased in its conducting state. With current flowing through the feedback path the base 14 of the transistor 11 will be driven to a more negative value with the result that transistor 11 will be saturated. Resistors 23 and 24 control the current through the feedback path and thus the bias on base 14. Both transistors will remain in the "on" condition until a positive pulse arrives at the input 20 and consequently provides a trigger signal to turn the transistor 11 "off" with the resultant turning off of transistor 12. Of course, the transistors will remain in their "off" conditions until a negative pulse arrives at the input and repeats the cycle as described above. Resistor 23 also functions to reduce the positive input triggering power since it offers an impedance in the feedback path when the circuit is "on." In other words the feedback path will not tend to load the input.

Figure 2:
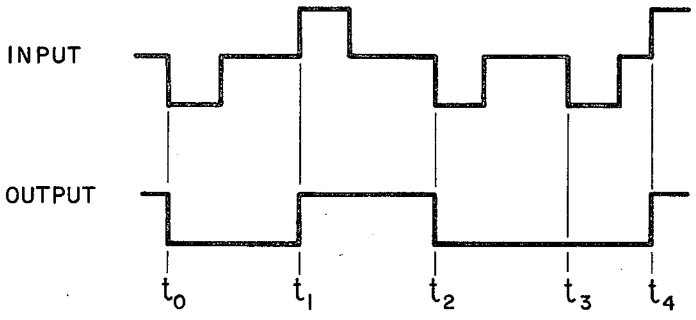
FIG. 2 is a graph of typical waveforms present in the operation of the embodiment of FIG. 1.

When the transistors are both "on" it can be noted that the output at terminals 29 is a signal having a negative potential. When the transistors are "off" the output signal at terminals 29 is essentially zero or ground voltage. By referring now to FIG. 2, the response of the circuit to various input signals in various sequences can be observed. For example, at time $t_0$ the arrival of negative input pulse causes the output to go to its negative level. This level is held until arrival of a positive pulse at $t_1$ causes the transistors to turn "off" and the output to return to its ground level. At $t_2$ once again a negative pulse turns the circuit "on." A later negative pulse at time $t_3$ has no effect on the output since it is already in its negative condition and remains so until receipt of another positive pulse as shown at time $t_4$.

By utilizing the diode 13 in the feedback path numerous advantages result in the overall operation of the circuit. Firstly, the diode will function to reduce the negative input triggering power because it will offer an infinite impedance when the circuit is off. In other words, the feedback path will not tend to load the input. Secondly, the diode provides an inherent degree of discrimination for input noise pulses. This results from the fact that a small forward voltage has to be overcome before a diode will actually conduct. In a germanium type diode this forward voltage is on the order of two-tenths of a volt. In a silicon type diode the forward voltage is on the order of from a half to one volt. Consequently, the magnitude of the negative signal necessary at the input, to turn the circuit "on" to the degree that the regenerative feedback saturates transistor 11, must exceed some threshold voltage dictated by the forward voltage of the particular type of diode used. In the absence of the diode, small negative noise signals might be effective to trigger the circuit in the same manner as if a negative pulse had been received and consequently an erroneous output would be produced. It is with regard to this feature that the use of the adjustable source 30 might be desirable. By adjusting the voltage of the source 30 to some desired level, the discrimination level for the input noise pulses may be varied, since the forward voltage of the diode plus the back biasing effect of the source 30 would have to be overcome before regeneration takes place.

It can therefore be seen that this invention provides a polarity sensitive bi-stable switching circuit which uses a minimum amount of components and consumes a minimum amount of power since no power is necessary when the circuit is in its stand by condition. It may furthermore be seen that this circuit provides a polarity sensitive bi-stable switching device which is capable of discriminating against noise level.

It should be understood that though the embodiment described is directed to a device which is turned "on" by a negative triggering pulse and "off" by a positive triggering pulse it could easily be modified to so react to respective signals of opposite polarities, i.e., to be turned "on" by a positive pulse and "off" by a negative pulse. The latter operation would merely necessitate substitution of opposite conductivity type transistors for each of the transistors in the circuit and a reversing of the poling of the diode 13 and the power source 26.

Although this invention has been described in the form of a particular embodiment it should not be limited thereto, since many modifications and changes could be made by one skilled in the art without departing from the spirit and scope of this invention.

What is claimed is:

1. A polarity sensitive bi-stable switching circuit adapted to produce a first output level in response to an input of one polarity and a second output level in response to an input of an opposite polarity comprising;

a PNP transistor having a base, an emitter and collector, said emitter being connected to ground potential, an NPN transistor having a base, an emitter and a collector, said collector of said PNP transistor being connected to said base of said NPN transistor, a source of negative potential connected between said NPN emitter and ground, a biasing resistor connected between said base and emitter of said NPN transistor for maintaining a fixed forward bias on said base and emitter of said NPN transistor and said collector of said NPN resistor in the non-conductive state of said PNP transistor, an output load connected between said NPN collector and ground, an input terminal for developing input signals across the base and emitter of said PNP transistor, causing base current to flow therethrough upon the reception of a negative input signal and current flow through said biasing resistor and said NPN resistor, whereby to develop a negative potential across said output load, a regenerative feedback circuit comprising a serially connected diode and resistor connected between said NPN collector and said PNP base and arranged to become conductive when said NPN collector is more negative than said PNP base for maintaining said negative potential output across said load, and said input terminal developing a cut-off potential across the base and emitter of said PNP transistor upon the reception of a positive input signal, whereby to cause cessation of said current flow and restore said fixed forward bias.

2. The circuit of claim 1 wherein said feedback circuit further includes a source of adjustable voltage serially connected with said resistor and said diode and arranged to back bias said diode at a predetermined desired voltage.

References Cited

UNITED STATES PATENTS

| | | | |
|---|---|---|---|
| 3,030,587 | 4/1962 | Gautherin | 330—138 X |
| 3,175,098 | 3/1965 | Grace | 307—288 X |
| 3,364,391 | 1/1968 | Jensen | 307—288 X |
| 3,392,290 | 7/1968 | Van Feldt | 307—288 |

ROY LAKE, Primary Examiner

J. B. MULLINS, Assistant Examiner

U.S. Cl. X.R.

307—288